(12) United States Patent
Collins et al.

(10) Patent No.: US 8,019,754 B2
(45) Date of Patent: Sep. 13, 2011

(54) METHOD OF SEARCHING TEXT TO FIND RELEVANT CONTENT

(75) Inventors: John Barrett Collins, Westport, CT (US); Jerome Verlin, Elkins Park, PA (US); Can Deniz Akyuz, Princeton, NJ (US); Stuart Donnelly, New York, NY (US)

(73) Assignee: Needlebot Incorporated, Princeton, NJ (US)

( * ) Notice: Subject to any disclaimer, the term of this patent is extended or adjusted under 35 U.S.C. 154(b) by 621 days.

(21) Appl. No.: 11/731,751

(22) Filed: Mar. 30, 2007

(65) Prior Publication Data

US 2007/0239707 A1    Oct. 11, 2007

Related U.S. Application Data

(60) Provisional application No. 60/788,352, filed on Apr. 3, 2006.

(51) Int. Cl.
*G06F 7/00* (2006.01)
*G06F 17/30* (2006.01)

(52) U.S. Cl. ........................................ 707/728; 707/131
(58) Field of Classification Search .................. 707/1–3, 707/5–7, 100–102, 728, 731, 723, 722, 705
See application file for complete search history.

(56) References Cited

U.S. PATENT DOCUMENTS

| | | | | |
|---|---|---|---|---|
| 5,619,709 A * | 4/1997 | Caid et al. | | 715/209 |
| 5,768,580 A | 6/1998 | Wical | | |
| 5,887,120 A | 3/1999 | Wical | | |
| 6,061,675 A | 5/2000 | Wical | | |
| 6,101,492 A | 8/2000 | Jacquemin et al. | | |
| 6,112,201 A | 8/2000 | Wical | | |
| 6,199,034 B1 | 3/2001 | Wical | | |
| 6,240,410 B1 | 5/2001 | Wical | | |
| 6,487,545 B1 | 11/2002 | Wical | | |
| 6,633,868 B1 | 10/2003 | Min et al. | | |
| 6,665,681 B1 | 12/2003 | Vogel | | |
| 6,675,159 B1 | 1/2004 | Lin et al. | | |
| 6,738,759 B1 | 5/2004 | Wheeler et al. | | |
| 6,832,242 B2 * | 12/2004 | Keskar | | 709/204 |
| 6,847,966 B1 | 1/2005 | Sommer et al. | | |
| 6,847,972 B1 | 1/2005 | Vernau et al. | | |
| 6,904,564 B1 | 6/2005 | Harris et al. | | |
| 6,907,431 B2 | 6/2005 | Lin | | |

(Continued)

OTHER PUBLICATIONS

Jenkins, Charlotte, et al., "Automatic Classification of Web Resources using Java and Dewey Decimal Classification" Apr. 1998, <http://www7.scu.edu.au/1846/com1846.htm>, p. 1-4.*

*Primary Examiner* — Brent Stace
(74) *Attorney, Agent, or Firm* — Mark Friedman; Steven Horowitz

(57) ABSTRACT

A method of locating relevant documents wherein documents are given a fingerprint comprising weights associated with particular topic categories of a classification system, each weight representing a degree to which the document relates to the particular topic category, a first piece of text is identified and given a fingerprint comprising a list of other weights associated with similar topic categories, the other weights representing a degree to which the first piece of text relates to the particular topic category. All or a portion of the universe of documents is searched by comparing the fingerprint for the first piece of text with the fingerprint for each document. You select those documents whose fingerprints have a predetermined degree of mathematical overlap with the fingerprint of the first piece of text. A user fingerprint of the user's recently accessed texts can be used in place of the first piece of text.

73 Claims, 8 Drawing Sheets

U.S. PATENT DOCUMENTS

| | | |
|---|---|---|
| 6,990,487 B2 | 1/2006 | Akaboshi et al. |
| 7,024,408 B2 | 4/2006 | Dehlinger et al. |
| 7,275,061 B1 * | 9/2007 | Kon et al. .................... 707/102 |
| 7,383,513 B2 * | 6/2008 | Goldberg et al. ............. 715/763 |
| 2002/0042793 A1 * | 4/2002 | Choi ................................ 707/6 |
| 2004/0049498 A1 * | 3/2004 | Dehlinger et al. ................ 707/3 |
| 2004/0068697 A1 * | 4/2004 | Harik et al. .................... 715/513 |
| 2005/0187923 A1 | 8/2005 | Cipollone |

* cited by examiner

DISAMBIGUATION

PROFILE 1
(SEEKING MOVIE)

PROFILE 2
(SEEKING SONG)

METHOD OF SEARCHING TEXT TO FIND RELEVANT CONTENT

PRIORITY INFORMATION

This patent application claims priority from U.S. provisional patent application No. 60/788,352 filed Apr. 3, 2006 by Applicants John B. Collins, Jerome Verlin and Can D. Akyuz.

COMPUTER PROGRAM LISTING APPENDIX

A computer program listing is included as an appendix to this disclosure in the form of a text file created on Aug. 10, 2009 by MS-Word 2000 in ASCII text format as a ".txt" file. This Computer Program Listing Appendix is incorporated herein by reference in its entirety. The first compact disc labeled "Copy 1" contains 9 kb, was created on Aug. 10, 2009 and has a file name "ComputerProgramListingAppendixJuly92009.txt". The second duplicate compact disc labeled "Copy 2" contains 9 kb, was created on Aug. 10, 2009 and has a file name "ComputerProgramListingAppendixJuly92009.txt"

FIELD OF THE INVENTION

The field of this invention is methods and systems for searching text, and more particularly, improved methods of searching large quantities of text to find relevant content by comparing two or more pieces of text for similarity of content that has been abstracted from the text.

BACKGROUND OF THE INVENTION AND DISCUSSION OF THE PRIOR ART

An individual wishing to find a piece of text that contains content similar to the content of another piece of text will often search for words that exist in both pieces. Likewise, an individual wishing to find relevant pieces of text will often search for specific words that are thought likely to indicate relevant content in text.

These techniques are central to methods for searching electronic records for relevant text but are also used for searching analog records. Examples of the latter would include concordances and library subject catalogs.

The limitations of existing methods are several: 1) words, and especially acronyms, may have multiple meanings; 2) large records, such as lengthy books and encyclopedias, might contain the specific words themselves but be largely irrelevant to the content sought or contain only a small section of relevant content in a much larger document; 3) text using synonyms of the specific words used for searching might not be found; and, 4) text written in foreign languages will be largely inaccessible.

In general, since there are many ways of expressing the same thought, words representing snippets of the text are not the ideal thing to look for. There is a compelling need for a user to find text that contains the meaning and thoughts that the user is looking for. There is a compelling need for a user to search and find relevant textual content that does not suffer from the drawbacks of the prior art and that allows a user who desires to find relevant content, and who tells the computer to look for some particular text, to infer the meaning of that text rather than to conduct a search that is confined to the literal words of the text themselves.

SUMMARY OF THE PRESENT INVENTION

The present invention addresses the limitations of searches based on words by abstracting the content of the individual's words to provide guidance for further searches. In one preferred embodiment of the method of the present invention the following steps take place:

1) The individual finds a first piece of text (a "target") containing relevant content;

2) A Plurality of classifications are assigned to the target according to a classification scheme such as the Dewey Decimal System, Library of Congress classification system, U.S. Patent classification codes or other classification systems, ontologies and taxonomies used for particular segments of the universe of all existing pieces of text;

3) Weights are assigned to the said plurality of classifications of the target;

4) The plurality of weights comprises a classification tensor. In the preferred embodiment, the plurality of weights is scaled such that the sum of squares of the weights adds up to unity (i.e. the number "1"). The scaled, weighted classifications constitute a fingerprint of the target. Alternatively, unscaled weights can be used. In this case, overlaps are computed with unscaled weights and compared later. Specifically, the overlap of a "target" piece of text with itself is compared to the overlap of a target piece of text with another piece of text.

5) A second piece of text is classified and scaled weights are assigned as described in steps 2, 3 and 4. The scaled, weighted classifications of the second piece of text constitute a fingerprint of the second piece of text;

6) The target text is compared to the second piece of text by calculating the overlap of the two fingerprints. To calculate the overlap, the fingerprints can be correlated to each other. The overlap is conveniently calculated by regarding each classification category as a dimension in an n-dimensional space (where "n" is the number of all possible classification categories) and by regarding each weight as a magnitude in that dimension. Each fingerprint, that is, each classification tensor, is reduced in the preferred embodiment to an n-dimensional vector. The overlap can be quantified by calculating the inner product of the two fingerprints. The second piece of text will be considered similar to the target if the overlap, or inner product, is sufficiently large.

OBJECTS AND ADVANTAGES

The following objects and advantages may be present in certain embodiments of the present invention:

(1) to provide an improved method of searching text;

(2) to provide an improved method of searching text to find relevant text;

(3) to provide an improved method of searching text that considers an overall meaning or content of the text rather than merely the individual words of the text;

(4) to provide a method of search for relevant text that is applicable to a large universe of text;

(5) to provide a method of searching text that in certain embodiments draws on a user's search history;

(6) to provide a method of searching text that in certain embodiments draws on the assumption that for at least a certain period of time a user will tend to want material that is similar to what the user's previously and recently accessed text;

(7) to provide a method of searching text that in certain embodiments has a step that creates for purpose of reference a user's fingerprint which characterizes the text that user looked at in the user's most recent searches in terms of a list of paired data, the first entry in the pair being a topic within a multi-topic classification system and the second entry in the pair being the degree to which the text involves (is classifiable as being in) such topic;

(8) to provide a method of searching for relevant text that uses as its starting point any piece of text that the user thinks is relevant;

(9) to provide a method of searching for relevant text that achieves a greater placement of a user's highly relevant "hits" higher up in the list of "hits";

(10) to provide a method of searching for relevant text that utilizes a user's previously displayed interest in certain types of text and which also can detect a change in the user's interest;

(11) to provide a method of searching text that can be used to obtain an improved ranking of search results from a previous search performed by a major search engine such as Google®;

(12) to provide a method of searching text that characterizes any piece of text as a list of paired data, the first entry in the pair being a topic of a multi-topic classification system and the second entry in the pair being the degree to which the text is classifiable as being in such topic;

(13) to provide a method of searching text that can more quickly find criminal or terrorist activities by people using chat rooms;

(14) to provide a method of searching text that improves the quality of Google® searches and of searches from other major search engines by re-ranking the search results obtained from such search engines to obtain more relevant rankings;

(15) to provide a method of searching the patent database and other similarly-sized databases that is an improvement over the current word based searches of the prior art;

(16) to provide a method of searching for relevant text whose algorithm contains only steps having scalar time requirements;

(17) to provide a method of searching for relevant text whose algorithm contains no steps that are so complex from the computer science point of view that updating the database takes too long;

(18) to provide a method of searching text whose time complexity is O(N) or faster;

(19) to provide a method of searching text that is ideal for updating databases, for example databases of a corporation;

(20) to provide a method of searching text whose algorithm only contains steps whose work is linearly proportional to the size of the database;

(21) to provide a method of searching for relevant text that finds relevant text based on the meaning of the text;

(22) to provide a method of searching for relevant text whose algorithm would not be misled by text in the form of acronyms;

(23) to provide a method of searching text that blocks pornographic or otherwise undesirable material more effectively than prior art methods and algorithms;

(24) to provide a method of searching text that improves the degree to which highly relevant search results are listed in the earliest part of the list of search results;

(25) to provide a method of searching text that improves the degree to which highly relevant search results are listed in the earliest part of the list of search results even for word or phrase searches that have been run countless times, i.e. the "Top Google® Searches";

(26) to provide a method of searching text that can operate on a pre-classified universe of text or a universe of text that has not yet been pre-classified;

(27) to provide a method of searching text that makes use of a particular classification schemes such as the Dewey Decimal System, Library of Congress classification system, U.S. Patent Classification system or another classification system;

(28) to provide a method of searching text that is particularly useful for searching text on the world wide web;

(29) to provide a method of improved text searching that allows advertisers who advertise in the universe of text to achieve higher click through rates;

(30) to provide a method of improved text searching that allows advertisers who advertise in the universe of text, for example the world wide web, to achieve higher revenues from their advertisements;

(31) to provide a method of comparing text based on the abstraction of the context of the text;

(32) to provide such a method of searching for relevant text in a universe of text which method can be enhanced and quickened considerably by pre-classifying the universe of text using an inverted list;

(33) to provide a method of searching text that allows a user to control the degree of precision level of the search results by modulating a "threshold cut-off" variable in the search algorithm;

(34) to provide a method of searching for relevant text that allows a user to adjust the precision level of the search to match the degree to which the user is searching for a very specific type of content;

(35) to provide a method of searching for relevant text whose algorithm creates a fingerprint for each piece of text searched;

(36) to provide a method of searching text whose algorithm represents any piece of text as a multi-dimensional vector where the number of dimensions is the number of topic categories in the classification system;

(37) to provide a method of searching text that requires classifying a universe of documents as a vector, classifying a target piece of text as a vector and then comparing the target vector with the vectors of the pieces of text in the universe of text in terms of its mathematical overlap with the target vector;

(38) to provide such a method as in Object and Advantage "(37)" where the comparison is performed by calculating the dot product between the vectors;

(39) to provide a method of searching text whose algorithm includes representing each piece of text as a vector and then normalizing the vectors to give the vector useful mathematical properties, such as establishing threshold for overlap computations;

(40) to provide a method of searching a universe of text that can be classified in approximately 10,000 topic categories wherein the algorithm makes use of simplification steps to speed up the searching;

(41) to provide a method of searching a universe of text that can be classified in approximately 10,000 topic categories wherein the algorithm makes use of simplification step that allows the algorithm to only have to search in up to 75 topic categories;

(42) to provide a method of searching text that is practical and effective;

(43) to provide a method of searching for relevant text that is grounded primarily in the meaning of text rather than the presence of individual words;

(44) to provide a method of searching text that measures the overlap in meaning between a "reference point" piece of text (sometimes called a first piece or a target piece of text) and the pieces of text in the universe of documents/text; and

(45) to provide a method of searching for text that in certain embodiments utilizes a user's fingerprint to implement the search without the user having to input any specific search term or phrase.

DETAILED DESCRIPTION OF THE PREFERRED EMBODIMENT

Figure 1A:
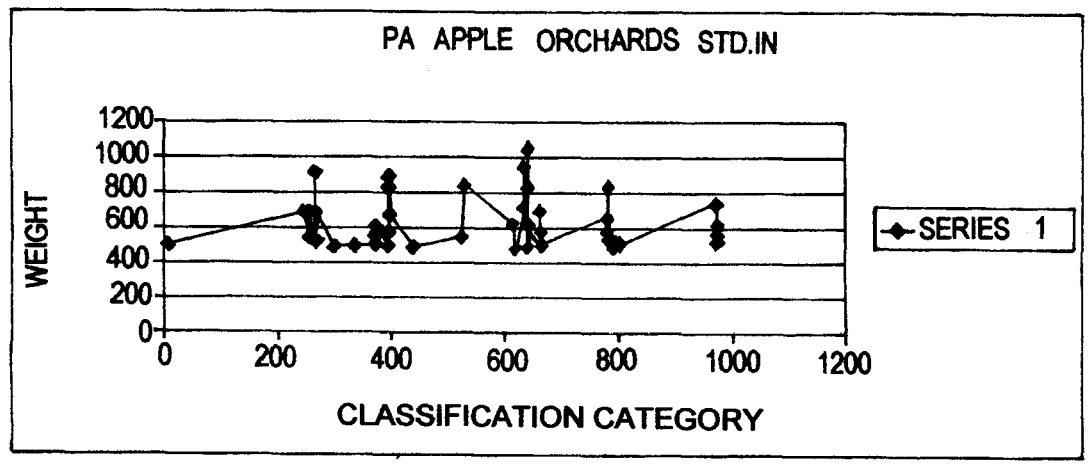
FIG. 1a is a graph showing a fingerprint of classifications for a target piece of text pertaining to Pennsylvania apple orchards in accordance with the method of the present invention.

In certain preferred embodiments of the method of the present invention, one has to classify the universe of text that is to be searched. As will be explained in further detail below, in other preferred embodiments, this step is unnecessary because the starting point of other embodiments of the method of the present invention can be a list of search results performed by a search engine such as Google® which has its own method of classifying and has already classified a large universe of documents, albeit in a proprietary manner.

The following is a generic description of the basic steps of the method of the present invention for locating relevant documents within a universe of documents that has not been classified.

The universe of documents is first classified by creating a fingerprint for each document in the universe of documents. The fingerprint can be said to represent a list. It should be emphasized that there can be a number of ways of describing the fingerprint. Furthermore, if the fingerprint is described as a list, there can also be a number of ways of describing that.

One way of describing the fingerprint is that it represents a list where each item in the list is composed of a pair of data. The first data item in the pair of data is a numerical representation of a topic category. For convenience, the term "topic" is sometimes used herein instead of the phrase "topic category". The second data item in the pair of the data is a numerical representation of a weight that has been assigned to the topic category represented by the first data item. The weight is a measure of the degree to which the text of the document in question is related to the topic category of the first data item, i.e. the extent to which it might be fitting to classify that document as being in that topic category (as a matter of library science). In terms of the algorithm, the topic category is first obtained and then the weight is assigned to said topic category. For clarity, an example of a pair of data would be (1234, 0.5). In that case the document is said to have a 0.5 relevance to topic category number 1234.

Another way of describing the fingerprint is that it represents a list of weights that correspond to particular topic categories of the classification system, where the weights represent the degree to which the document or text is related to that particular topic category. Another way of describing the fingerprint is that the fingerprint represents a list of topic categories that a piece of text most relates to and weights associated with said topics. Still another way of describing the fingerprint is as a mathematical vector in an n-dimensional space where a particular weight associated with a particular topic category represents the magnitude of the vector in that dimension and where the topic categories represent the dimensions of the space.

The topic categories are those that appear in a particular classification system. An example of a classification scheme or system is the Dewey Decimal System, the Library of Congress's classification system, the U.S. Patent & Trademark Office Classification System. Other classification systems, ontologies and taxonomies used for particular segments of the universe of all existing pieces of text may also be used. In a preferred embodiment, however, the fingerprint list includes (has a nonzero weight for) only those topic categories that most closely (as compared to the other topic categories) relate to the text of the document (in the universe of documents). Accordingly, while a particular classification system might have 10,000 topic categories, the fingerprint list takes only the most related topics, the concept of "most related" being defined more clearly and precisely below. For example, if "music" hypothetically were a topic category and the target text were an article heavily focused on music, then the topic category "music" would be included in the fingerprint list along with the weight measuring the extent to which the target text relates to music.

In a preferred embodiment, the assigning of weights relating a text or a document to each topic category is accomplished through one of various commercially available automated computer programs that are word-based. Typically, such programs take into consideration the frequency of the words, among other things. With respect to the Dewey Decimal System of classification, such a commercially available program exists to assign Dewey Decimal System classifications and weights. It is called Scorpion Open Source Project and it is owned by Online Computer Library Center, Inc. ("OCLC") of Dublin, Ohio. Information (incorporated herein in its entirety by reference) concerning using OCLC's Scorpion Open Source Project may be found at http://www.oclc.org/research/software/scorpion/default.htm and at http://www.oclc.org/research/projects/auto_class/default.htm. Another product called the Sense Engine is available from Crystal Reference Systems, Limited of Holyhead, UK (see www.crystalreference.com) and it performs similar functions for another classification system. Likewise, the MTI (Medical Text Indexer) software, produced by the National Library of Medicine's Medical Text Indexing Initiative, automatically classifies text relevant to medical interests.

It should be appreciated that while the method of the present invention requires that some automated program to assign weights is typically a program that measures the frequency of words, there may be other computer programs that are capable of assigning weights in other manners. For example, it is believed that artificial intelligence programs can parse the grammar of the sentence of a text and reach a conclusion from this as to the relatedness of a text to a particular topic category. Thus, the method of the present invention is not concerned with the algorithm of the computer program that assigns weights to each topic category with respect to a piece of text or a document.

It is further noted that the term "document" or "text" is to be understood broadly and incorporates graphics, foreign languages and any data presentation known or presently unknown that can be made to follow the steps of the method of the present invention.

In the next step in the method the user identifies a first piece of text, called a "target" text that contains relevant content. This is done in one of several ways—either by typing text in, selecting a piece of text that was previously found in a previous search or provide a collection of past search terms searched for, or in other ways.

Then the user creates a "fingerprint" for this target text. Again, using the way of describing the fingerprint as a list of paired data, the fingerprint represents a list where each item in the list is composed of a pair of data, the first piece of data in the pair being a numerical representation of a topic category and the second item in the pair being a numerical representation of a weight. Again, in a preferred embodiment the fingerprint list includes only those topic categories that most closely (as compared to the other topic categories) relate to the target text. Thus, each weight is associated with each of a plurality of topic categories and describes a degree to which the target text or piece of text relates to the topic and hence can be properly classified in the topic category as a matter of library science.

The target text is then compared to each of the documents in the universe of documents by calculating the overlap of the two fingerprints, i.e. by comparing the fingerprint for the target or first piece of text with the fingerprint for each document in the universe of documents. The output of this search is a ranking of each document in terms of the mathematical overlap of its fingerprint with the fingerprint of the target text.

To calculate the overlap, the fingerprints can be correlated to each other. The overlap is conveniently calculated by regarding each classification category as a dimension in an n-dimensional space (where "n" is the number of all possible classification categories) and by regarding each weight as a magnitude in that dimension. Each fingerprint, that is, each classification tensor, is reduced in the preferred embodiment to an n-dimensional vector. The overlap can be quantified by calculating the inner product of the two fingerprints. The second piece of text will be considered similar to the target if the overlap, or inner product, is sufficiently large.

Finally, the method selects those documents in the universe of documents whose fingerprint commonality or overlap (representing the degree of that document's mathematical overlap with the fingerprint of the target text) ranks high enough based on a threshold number set in advance.

With respect to the target text and with respect to the documents in the universe of documents, the plurality of weights comprises a classification tensor. In one preferred embodiment, the plurality of weights is scaled. In a further preferred embodiment, the plurality of weights is scaled such that the sum of squares of the weights adds up to unity. The scaled, weighted classifications constitute a fingerprint of the target.

In an alternative embodiment, unscaled weights can be used. In this case, overlaps are computed with unscaled weights and compared later. The overlaps are calculated with unscaled weights but then scaled after the fact to put the overlaps in quantitative order. Specifically, the overlap of a "target" piece of text with itself is compared to the overlap of a target piece of text with another piece of text. In other words, assuming the type of scaling being performed is scaling to unity (i.e. normalization), after computing the overlap number, which involves taking the inner product of the two vectors, one would take that number and normalize it after the fact by simply dividing that number by "x", where "x" is the product of the square root of the sum of the squares from the first vector (the first vector for convenience being considered the fingerprint of the target text) with the square root of the sum of the squares from the second vector (the second vector for convenience being considered the fingerprint of the text you are comparing it to).

It should be fully appreciated that the present invention contemplates that the timing of the scaling of the weights is not essential to the present invention. There may for example be automated computer programs that calculate the weights and also scale the weights so that their output is already scaled weights.

In theory, unscaled weights can be used and the overlaps never scaled either but if this were done the overlaps would only represent a qualitative measure of the similarity between the fingerprints. In such a case the overlaps could possibly provide some meaning if, for example, the automated computer program that provided the weights had a fairly narrow range in which the weights fell.

To the extent that the fingerprints are viewed as vectors in n-dimensional space, scaling of the weights represents make the lengths of the vectors uniform so that only the direction of the vectors are compared.

As can be appreciated, once a fingerprint has been determined for a piece of text, other pieces of text with similar fingerprints can readily be found. This can occur even if the other pieces of text contain no words in common with the target and even if the second piece of text is written in a foreign language.

Abstracting the Interests of the Individual User

The present invention further pertains to assembling a fingerprint not of a piece of text but of the individual user. As an individual user accesses a piece of text, the fingerprint of this piece of text can be summed into an accumulator. This means that the algorithm adds together the weights of the several fingerprints of the various texts that the user accessed. As an example, if a portion of one text fingerprint is said to have data pairs (1234, 0.3), (1235, 0.1) and (1236, 0.25), a portion of a second text fingerprint is said to have data pairs (1234, 0.4), (1235, 0.15) and (1236, 0.05) and a portion of a third text fingerprint is said to have data pairs (1234, 0.5), (1235, 0.11) and (1236, 0.6) then the sum of this portion of these three text fingerprints would be (1234, 1.2), (1235, 0.36) and (1236, 0.9). The output of this is a new "user" fingerprint that can be said to represent the cumulative fingerprints of the most recently accessed texts accessed by the user over a defined period of time in the past. The cumulative fingerprints can be said to have cumulative weights as the first item in the pair of data. In addition, the user fingerprint can be said to have cumulative weights each of which represent the degree to which recently accessed texts cumulatively relate to that particular topic category.

In other alternative embodiments the user fingerprint may be obtained by having the algorithm perform a mathematical operation other than simply add together the weights of the several fingerprints.

In one preferred embodiment, when it is said that a user accesses a piece of text, it means the user accesses the text of web links he clicked on that came up during searches conducted by the user.

Each time a single text fingerprint is added to the user fingerprint, the accumulator is re-scaled (e.g. the plurality of weights is scaled such that the sum of squares of the weights adds up to unity) as described above. The theory behind the "user fingerprint" is that a user with an accumulator superimposing the fingerprints of previously interesting pieces of text is thought likely to continue to be interested in similar content. Subsequent searches for relevant text can be re-ranked according to the fingerprint of the user. The user fingerprint can be used instead of a target fingerprint as the reference point for the algorithm of the present invention. It would be unnecessary in that case to even locate a first piece of text whose fingerprint would have to be obtained and then compared to the documents in the list of documents or to the universe of documents being searched. The fingerprint for any document can simply be compared to the user fingerprint and the overlap measured.

In this fashion, words or acronyms will be automatically disambiguated.

The individual user need not explicitly identify a "target" in order to guide the method to find relevant text. The user's own actions cause the user's fingerprint to be accumulated. Thus, by the action of accessing text, the user informs the method of the content that interests the user.

Detecting Change in User's Interest.

From time to time, an individual user will be drawn to a different subject. In this case, the user's fingerprint would mislead the method described herein. Change in interest can be detected by maintaining two fingerprints' of the user's interests. One fingerprint (sometimes called the user fingerprint) is the superposition of a larger number of fingerprints of recently accessed text. A second fingerprint (sometimes called the second user fingerprint) is the superposition of a most recent smaller number of fingerprints of recently accessed text. The second fingerprint is constructed exactly like the first with the exception that it superimposes a smaller number of fingerprints. The overlap between the second fingerprint and the user fingerprint is repeatedly measured. A change in interest will be detected when the overlap of the first fingerprint with the second fingerprint falls below a selectable value. Thus, for example, if the first user fingerprint accumulated 100 fingerprints of text, the second user fingerprint might accumulate only the most recent five. In this fashion, the user, by accessing five pieces of text dissimilar to those that had previously interested the user, would instruct the method to disregard the previous fingerprint of the user and direct itself to the user's new interest.

A user has the further option of storing a plurality of user fingerprints. By selecting a relevant user fingerprint, the user can instruct the method to find relevance in whichever stored fingerprint the user chooses.

The method and system described herein can also select a fingerprint automatically from the plurality of stored fingerprints. Automatic selection occurs by comparing the overlap of the fingerprint of recent text with the plurality of stored fingerprints. Whichever of the plurality of stored fingerprints has the greatest overlap represents the user's current interest.

Variable Specificity

At times, a general purpose classification system might have insufficient resolution to be useful. A user interested primarily in minutiae of one topic might find a broad classification inadequate. The method described herein can adjust its specificity by changing the number of possible classification categories. Using the Dewey Decimal System as an example, a basic classification vector might contain 1000 dimensions corresponding to three-digit Dewey classifications. A user wishing to find more specific text can instruct the method to sub-divide the 1000 categories into 10,000, 100, 000 or a million categories, and so on. The user might further instruct the method to disregard classifications that provide large contribution to the fingerprint but obscure the details of classification which are most significant to semantic characterization relevant to a user having a specific interest. Some weights of the fingerprint are then disregarded. For example, boilerplate legal language in a document may misleadingly make a document related to music seem "relevant" to a hypothetical topic category called "law".

System of Implementation

In the preferred embodiment, the method described above is implemented by a suite of software programs.

I) Classification

Specifically, a piece of text is classified using the Scorpion program (see above) although those skilled in the art could use alternative programs such as, but not limited to, those enumerated above.

The Scorpion program produces classifications based on the Dewey Decimal System. A plurality of classification indices is produced along with weighting factors. The indices can vary in precision from three digits to a greater number of digits up to eight or more. The weighting factors provide relative likelihoods of the correctness of the classification.

A) Number of Classifications

In a typical application, about seventy-five classifications and their corresponding weighting factors are produced. The classifications can have different levels of precision. That is, some of the classifications of a particular piece of text might have just three digits of precision while other classifications could have four, five, six or more digits.

The method has a small sensitivity to the number of classifications. Thus, the preferred number of classifications can be varied by the user if an increase or decrease in the number of classifications is thought to produce more useful results. It is varied simply by instructing the automated program (i.e. Scorpion) as to the number of weights to use for each document.

B) Setting the Precision Level

The level of precision in comparing two pieces of text is determined by the number of digits in the classification code. A user wishing to be inclusive of the greatest possible pieces of text would choose a low level of precision. If low precision is preferred, as few as three, or even fewer, digits of precision would be used. A user searching for a very specific type of content would employ a larger number of digits, up to eight or more.

In our embodiment, about four digits of precision appear to be a useful starting point. Four digits of precision provide up to 10,000 classification categories.

Setting of the precision level can be automated. A useful measure of the success of the method in finding relevant text is the value of the largest dot product of the fingerprint of the target text with any of the pieces of text found in the domain of searched text. Whenever the largest dot product is small, the level of precision can be lowered automatically until the largest dot product is greater than some chosen threshold.

In our embodiment, a convenient threshold for the dot product is about 0.2. Whenever the largest dot product is less than 0.2, the level of precision is reduced by one digit until the largest dot product exceeds 0.2.

C) Accumulating the Weighting Factors

For easiest comparison, the classifications and their corresponding weighting factors can be collapsed to a uniform level of precision. Once a choice is made for the level of precision, classifications corresponding to higher levels of precision are collapsed to the uniform lower level.

If, for example, four digits of precision are being used, then classifications having five digits of precision are combined and regarded as one classification at a lower level of precision.

To illustrate, a piece of text producing the set of classifications 123.45, 123.46 and 123.47 (and weighting factors of 878, 1024 and 655 respectively) can be regarded as being in the four digit classification 123.4. The weighting factors for classifications 123.45, 123.46 and 123.47 are combined.

A number of choices exist for combining the weighting factors. In our embodiment, the weighting factors are summed. Other embodiments can use, alternatively, an average, a median, a maximum, a minimum or any other suitable mathematical function of the weighting factors.

In the illustration given above, the weighting factors for classifications 123.45 (weighting factor 878), 123.46 (weighting factor 1024) and 123.47 (weighting factor 655) are added to produce the collapsed classification 123.4 with a weighting factor of 2557. This procedure can be continued until any desired smaller level of precision is reached.

II) Display of Classification—the "Fingerprint"

Figure 1B:
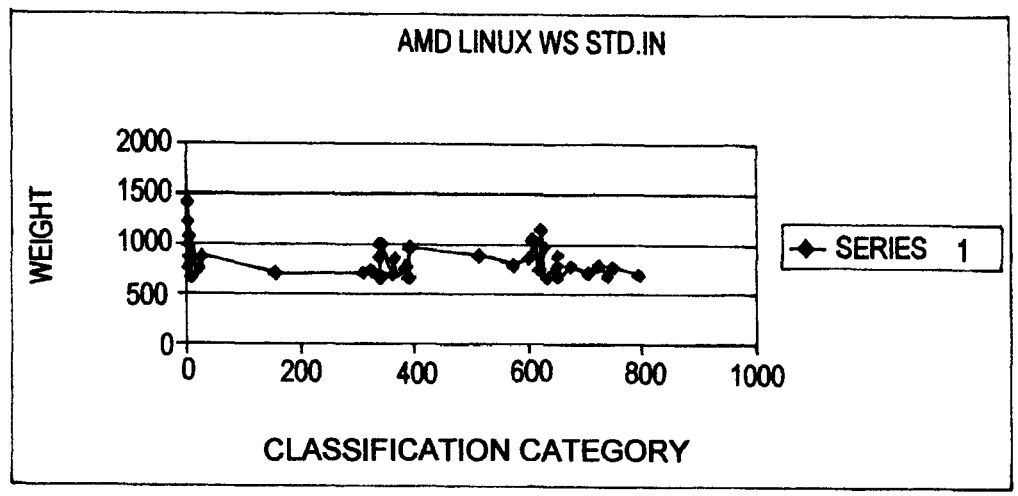
FIG. 1b is a graph showing a fingerprint of classifications for a target piece of text pertaining to AMD Linux workstations in accordance with the method of the present invention.

The classification of content can conveniently be displayed as a graph having as its horizontal axis the Dewey Decimal codes and its vertical axis the accumulated weights of those codes. FIGS. 1a and 1b are two such examples of fingerprints graphically represented this way. FIGS. 1a and 1b relate to two searches—one search for a piece of text resulting from the phrase "Pennsylvania Apple Orchards" and one search for a piece of text resulting from the phrase "AMD Linux workstations". It is evident upon inspection that the overlap between the two fingerprints depicted in FIGS. 1a and 1b will be small.

It is noted that the dots in the graphs of the drawing figures represent non-zero weights. For the purpose of more easily interpreting the graphed data, the dots in these graphs have been connected by lines. These connecting lines traverse categories whose weights are actually zero.

III) Comparison of Content

Once the list of classifications and their accumulated weighting factors have been constructed, two pieces of text can be compared for similarity as described above in the section discussing "fingerprints" and abstraction of content.

The two lists of classification categories and corresponding weights can conveniently be regarded as normalized, sparse vectors have as their number of dimensions the number of possible categories of which only about 75 can have non-zero weights (since the maximum number of classification weights is chosen to be about 75). In the preferred embodiment, the comparison is made using a dot product of these two vectors, the formula for which can be found in numerous elementary texts. Two pieces of text having similar fingerprints will have a dot product approaching unity. Dissimilar pieces of text will have dot products approaching zero.

IV) Ranking of Similarity

A) Case A: Classifications of Comparison Text are Already Computed

If the classification categories and weighting factors of potential comparison pieces of text are already known, the similarity of a target piece of text to the potential comparison pieces of text can be simply computed by means of the dot product at the chosen level of precision (i.e. the chosen number of classification categories, or, the chosen number of digits of precision).

To achieve this simplicity of comparison, classification categories and weighting factors can be appended to a piece of web text at the time the piece of web text is indexed by a web searching program. In the universe of web text this would imply re-examining all text currently known to the web searching program. The term "universe of text on the world wide web" refers to the universe of web text or the universe of text on the world wide web that a web search engine, such as Google® or other search engines, can search.

In smaller domains of the universe of web text, such as the US Patent and Trademark Office's database of US patents, or an annual portion of the Reuters database, it is feasible for an individual user to pre-classify all of the pieces of text in this smaller domain.

Thus, for example, a user wishing to find a patent description that is similar to a target patent description could compute the dot product of the target patent to the classification vectors of all the patent descriptions in the database.

Speeding Up the Calculation

One method of finding the most similar content is to search every piece of text and compute their respective dot products. While this is simple to program and might be suitable for small databases of text, it would become very slow as a database became large. Consequently, databases are preferentially searched by means of an inverted list. Inverted lists are used routinely to search for documents containing specific words. A brief description of the use of inverted lists to search for documents containing specific words is useful in order to describe the use of inverted lists in searching for classifications.

When a user enters a search term in a search engine, the search engine does not scan the universe of text looking for occurrences of that term. Rather, the search engine has prepared earlier a list of all words that exist in the universe of text. When a new document is added to the universe of text known to the search engine, the search engine records in the list of all words an entry, for each word in the list, indicating that the new document contains a specific word. Thus, when a user enters a search word, the search engine already knows the location of every document that contains that word. If multiple search terms are used, finding documents that contain all the search terms is a Boolean merge of several lists.

In our invention, the concept of inverted lists is used to find text whose fingerprint is similar to the user's fingerprint.

Algorithm for Inverted Search of Classification Weights with Threshold Cutoff of Overlaps In this section, a means is described to accelerate the search for pieces of content having high overlap. Acceleration is achieved by two algorithmic devices. The first is an inverted list. That is, a database is maintained that stores a pointer to a piece of content having a non-zero weight for a given classification. The second is a formula by which a lower bound to the overlap can be set below which the user is no longer interested in the content.

Inverted List

In our proposed embodiment, a piece of content (i.e. a "document") is classified into 75 weighted categories out of 10,000 possible categories (later, we will discuss alternative classifications involving different numbers of possible categories, specifically 1000 and 100,000).

In our inverted list, each possible category (of the 10,000 possible categories) is associated with a an ordered list containing data pairs comprising a) a pointer to the document, b) the classification weight of that document. The list is ordered according to the magnitude of the classification weight.

When seeking documents similar to a target document (or other word string), we first classify the target. Other documents similar to the target will be found only in those lists corresponding to the classification categories that exist in the target. Since we keep no more than 75 classification weights, we need examine no more than 75 ordered lists (out of 10,000 lists in total).

In practice, the search for similar documents would occur like this:
1) classify the universe of documents (done once, and added to for each new document);
2) create a database of 10,000 lists (one for each classification category) containing pairs of data consisting of pointers and weights (in order by weight) (done once, and added to for each new document);
3) classify the target;
4) compute the similarity of the target with documents in the database by calculating the overlap of the classification weights of the target with those of each candidate document in the universe of documents. Note that we need traverse no more than 0.75% of the lists since no more than 75 weights are preserved out of 10,000 possible classifications. (Note also that each document could be represented as many as 75 times if it were to have 75 unique surviving classification weights).

The following example is provided. Suppose a target had classification categories of 123.4, 234.5 and 345.6 with weights of 0.75, 0.60 and 0.28 (note: the sum of squares is ~1.0). To find similar documents, we need look only in the lists of documents with classification weights in these three categories. If a document lacks a classification weight in all of these categories it cannot have a non-zero overlap with the target.

Database Size for the Inverted Lists

Suppose we have $10^{}9$ documents each having 75 weights (the maximum allowed, in practice, much less). We need to store, at a minimum, a record containing an address pointer and a weight for each entry. Suppose further that the record requires 13 bytes of memory. Storage needed for the database of lists would then require $10^{}9 \times 75 \times 13$ bytes=$10^{**}12$ bytes, i.e. one terabyte.

Storage Plusses and Minuses, i.e. Factors that Affect Storage Requirements

Plusses, Factors that Add to Storage Requirements

The database management program is likely to add it own overhead to the storage requirements. This could be substantial. Overhead is likely to multiply the storage requirement by a small number.

Minuses, Factors that Reduce Storage Requirements

In practice, far fewer that 75 classification weights survive the bucketing process. The "bucketing process" refers to the process of taking the results of the automated computer program (i.e. Scorpion), selecting to a uniform level of precision and taking weights in finer levels of precision and combining those weights into the topic categories having a coarser level of precision). In our experience a realistic number is 5 to 20. If we assume that 15 weights survive, our memory requirements are reduced by a factor of 5.

Thresholds for Storage of Classification Weights

Recall that the overlap calculation is a dot product, i.e. a sum of squares. As a result, a weight that is substantially smaller than the largest weight for a document will contribute very little to the overlap. It would then be profligate to retain all the weights. Discarding the weights that contribute small values to the sum of squares (say, less than 5%) could lead to very substantial savings in memory requirement. In the example above, the smallest weight (i.e. 0.28) contributes only 0.08 to the overlap. The cutoff for discard will need to be determined from practical experience.

Alternative Classifications

If we were to choose a different number of possible classifications, i.e. 1000 or 10,000, we arrive at a similar memory requirement.

If we choose 1000 classifications, each document could still reside in 75 of them. This is very unlikely. In our experience, documents populate only a small number of classification regions. Consequently, the storage requirements to store our documents with only 1000 categories is somewhat less than is required for 10,000 categories.

By similar analysis, the storage requirements for a classification with 100,000 categories will be somewhat greater than needed for 10,000.

Using sensible data retrieval methods, it is possible to store a few terabytes on disk and retrieve them in batch mode for computation. In our model, a single list from our database of 10,000 lists could be swapped into main memory for computation and then be replaced by the next needed list. To compute an overlap, not more than 75 lists would need to be swapped into memory to compute one value.

Threshold Cutoff

Discussed above is an idea to limit the stored classification weights to those that will make substantial contributions to calculated overlaps. This is a static cutoff implemented at the time the database is created. The static cutoff reduced the need for computer storage.

A dynamic cutoff is described below that reduces the need for computer processing time.

When an overlap calculation is performed, we compute the dot product of the classification weights of the target with those of the documents in the database. The weights of the target are ordered and normalized (i.e. the sum of squares equals one) with the largest first.

To begin, we start with the category corresponding to the largest weight in the target. In our database there will be an ordered list containing pointers to all the documents with surviving classification weights in that category. This list is ordered, as well, having at the beginning of the list the documents with the largest weights for that category.

Example

Using the same example as used above (Suppose a target had classification categories of 123.4, 234.5 and 345.6 with weights of 0.75, 0.60 and 0.28) we can examine the dynamic cutoff. A perfect overlap is 1.0. Let's assume that the target is not in the database. We look first in the list corresponding to category 123.4 (because the target had its largest weight for this category). Let's further suppose that the first entry in the list for category 123.4 has the following classification weights: 123.4 0.80, 234.5 0.20 and others not including 345.6. The overlap would be 0.75×0.80+0.60×0.20=0.72. This warrants further examination.

Recall that the greatest overlap will occur when the weights of the document in the database exactly match the weights of the target. In our example, the weight for category 123.4 in the first entry in the database was 0.80 (compared to the target's 0.75). Consequently (because our weights are normalized), the overlap cannot be a perfect 1.0 regardless of how the remaining weights are distributed. We can calculate the least amount by which our overlap must fall short.

After calculating the first term in the overlap (which we'll call t1×d1, i.e. 0.75×0.80=0.60) the overlap stands at 0.60. 0.60 is actually greater than the product that would obtain had the target been in the database. But, there is a price for this. The remaining weights in the database must be reduced because our weights are normalized.

After the second term is computed, our overlap stands at:

$$0.75 \times 0.80 + 0.60 \times 0.20 = 0.72$$

If the target had been in the database, the overlap at this stage would have been 0.9225 i.e. 0.75×0.75+0.60×0.60=0.9225.

The difference between 0.9225 and 0.72 (i.e. 0.2025) cannot be recovered. The upper bound to this overlap is 0.7975. This result can be asserted without knowledge of the remaining terms other than the property that the weights are normalized.

At some point in our ordered list of weights, the weight for the first category will fall below the corresponding weight in the target. At this point the upper bound for the overlap will be lowered even after one product of terms. Again using our example (Suppose a target had classification categories of 123.4, 234.5 and 345.6 with weights of 0.75, 0.60 and 0.28), Let us use as an example that the document in the list had a weight for category 123.4 of 0.4. The overlap after one term would be:

$$0.75 \times 0.40 = 0.300 \text{ which is less than}$$

$$0.75 \times 0.75 = 0.5625 \text{ by } 0.2625.$$

The upper bound to our overlap is therefore 1.0−0.2625=0.7375.

At some further point, the weight for this category will fall to a level such the upper bound for the overlap will fall below a dynamic threshold. That is, a value that the user designates as being beneath his level of interest. Since our list is ordered by the classification weight, no further computations would be needed for this classification category.

At the level of individual documents, the overlap calculation can be halted whenever the upper bound falls below a threshold.

In the preferred embodiment being discussed, a document can exist in up to 75 categories. Accordingly, documents similar to the target will therefore be encountered several times.

A similar result is expected for the remaining categories. However, the situation is more complicated. Consider the second category in our target, 234.5. (Suppose, again, a target had classification categories of 123.4, 234.5 and 345.6 with weights of 0.75, 0.60 and 0.28) The first entry in the database for this category (i.e. 234.5) could have a very small weight for this category but a very large weight for the first category (recall that our lists are ordered by the weight for the category of the list). In this case, the overlap could still be large in which case we would have seen the document already and need not recompute the overlap.

However, after scanning the first inverted list, the algorithm stopped after falling below a pre-determined greatest upper bound in the dot product. At this point, the algorithm has computed a dot product for every piece of text having a weight for the first classification category (i.e. 123.4) that is greater than the weight of the last piece of text examined. Consequently, in all other inverted lists, the algorithm will encounter no new piece of text having a weight for the first category that is greater than the weight encountered in the last piece of text examined with respect to the first category.

This observation has an important mathematical consequence. As the algorithm moves on to the second inverted list, the greatest upper bound is limited by the last value examined of the weight in the first inverted list. As a result, the scan of the second inverted list will now be terminated based on a greatest upper bound that is itself limited by two weights, i.e. the last value examined in the first list and the last value in the second list that causes the overlap to fall below its threshold. Moving on to the third list, the greatest upper bound is already limited by the last values of the weights in the first two lists. Clearly, the number of documents whose dot products must be computed will diminish rapidly as the algorithm searches further inverted lists.

B) Case B: Classifications of Comparison Text are Unknown

For the universe of web text, the classifications and weighting factors of a particular piece of text will normally be unknown. In these cases, it is not feasible for an individual user to classify the universe of web text.

In order to compare a target piece of web text, or to compare a user's personal "fingerprint" of interests to a piece of web text, to a piece of unclassified text in the universe of web text an additional step is needed. In the preferred embodiment, a web searching program such as Google is first used to find a list of pieces of text containing a user's search terms. Those trained in the art will recognize that any tool for searching a database for search terms can be used in place of Google.

The list found in this manner will suffer from the limitations of web searching discussed above in the section discussing comparing two pieces of text for similarity. Nonetheless, many relevant pieces of text will be found in the first few dozens, or few hundreds, of the pieces of text found by Google® using search words alone.

It is quite feasible for a user, using the invention described herein, to classify the first few hundred pieces of text returned by Google®. In our embodiment, the classifications produced thereby are compared to a target piece of text, or to the user's personal fingerprint. After completing these comparisons, the list returned by Google® is re-ranked according to the magnitude of the dot products.

V) Display of Results

Evaluation of any improvement to Google's results is subjective. To evaluate our results, a number of searches have been conducted using Google or other web searching programs. The first few hundred pieces of text returned in these searches were inspected and scored for relevance to the target text. In our examples, a five point scale is used on which a score of "5" indicates highest relevance and "1" indicates lowest relevance. If the search program were perfect, the text returned by the search program would be perfectly sorted such that all the text scored with a "5" would come first followed by all of the text scored with a "4" and so on.

In reality, the "5"'s are interspersed among pieces of text having lower relevance. The objective of the present invention is to improve the sorting of the retrieved text to more nearly approximate perfect results.

Figure 2A:
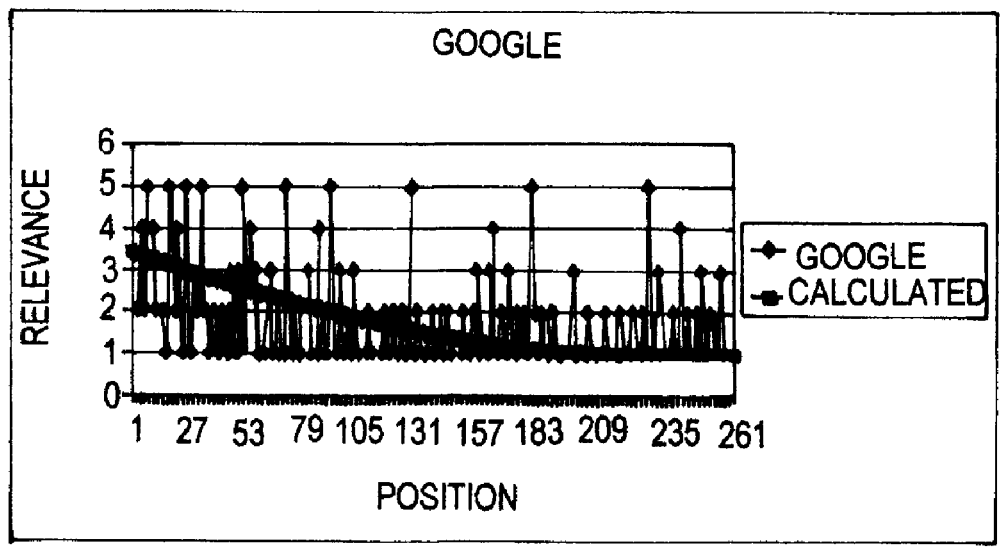
FIG. 2a is a graph showing relevance of hits at various positions in a search conducted by Google® for "Pennsylvania apple orchards"

FIGS. 2a, 2b, 2c 3a, 3b, 3c, 4a, 4b, 4c illustrate the improvements in search relevance achieved by the present invention. A curved line passes through each graph. A full description of the means of finding the curved line is given in a later section labeled VI) Quantification of improvement B) Holistic Methods As seen in FIG. 2a, Google achieves a baseline level of relevance which the present invention means to improve. As seen in FIG. 2a, quite a few highly relevant pieces of text are found well after the first few dozen results returned by the search program.

Figure 2B:
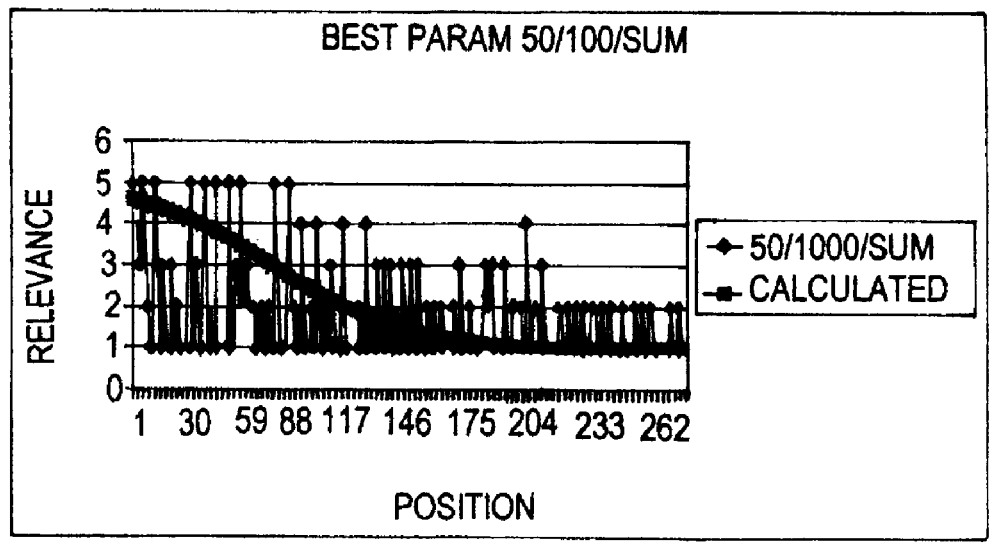
FIG. 2b is a graph of improved relevance of hits taken from the Google® search of FIG. 2a shown at various positions by searching using the algorithm of the present invention.
Figure 2C:
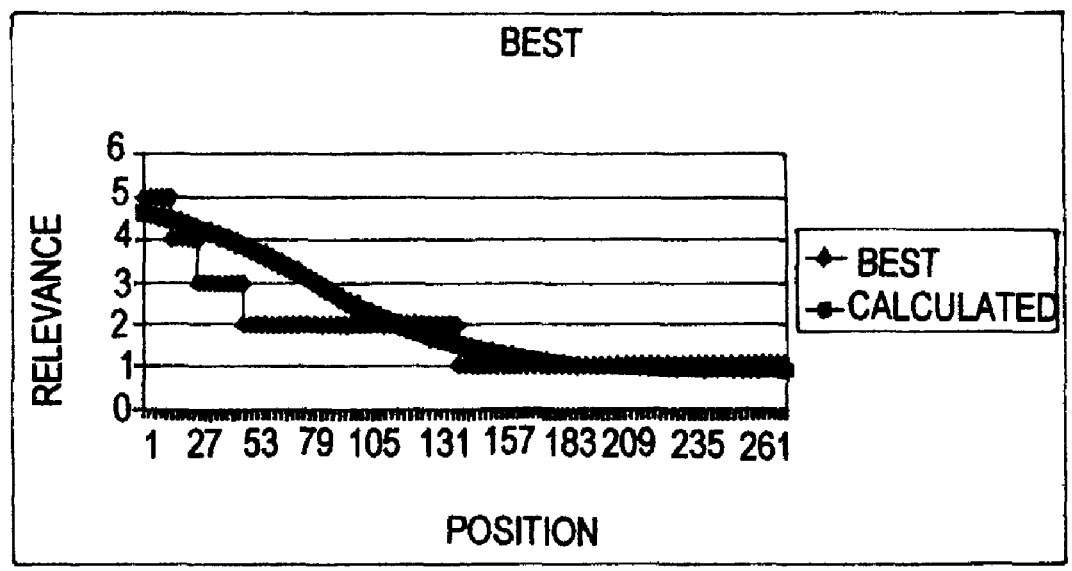
FIG. 2c is an ideal graph of perfect relevance for position for a search of "Pennsylvania apple orchards"

As shown in FIG. 2b, application of the method of the present invention to improve the relevance according to the algorithm described above yields qualitatively improved re-sorting of results in comparison with the results shown in FIG. 2a. In the ideal situation, where the relevance is perfectly sorted, the graph showing relevance of hits at various positions in a search for "Pennsylvania apple orchards" would appear as shown in FIG. 2c. Perfect relevance has not been achieved, but a significant improvement over Google's relevance is clearly visible.

Figure 3A:
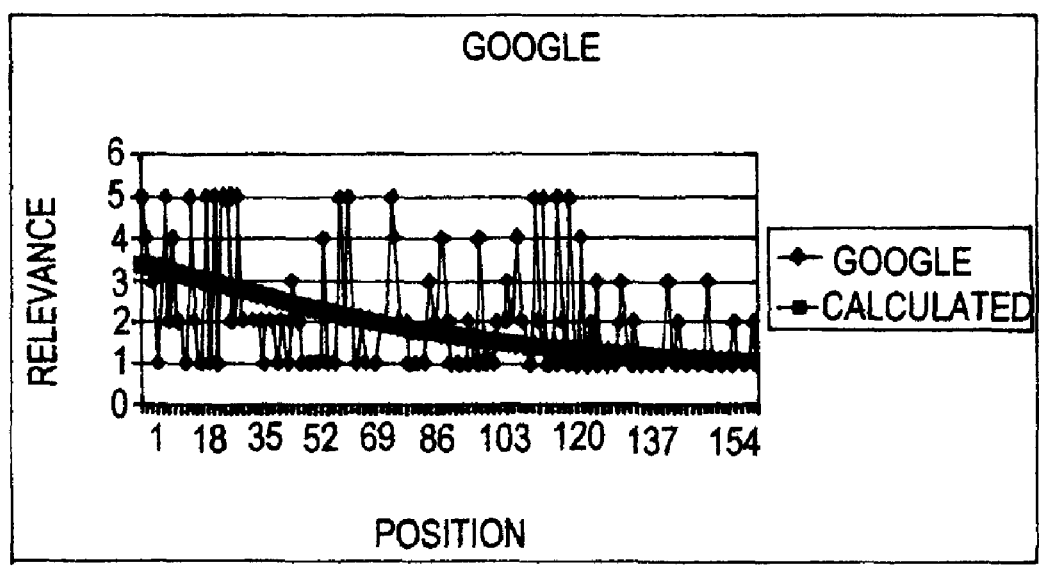
FIG. 3a is a graph showing relevance of hits at various positions in a search conducted by Google® for "AMD Linux workstations"
Figure 3B:
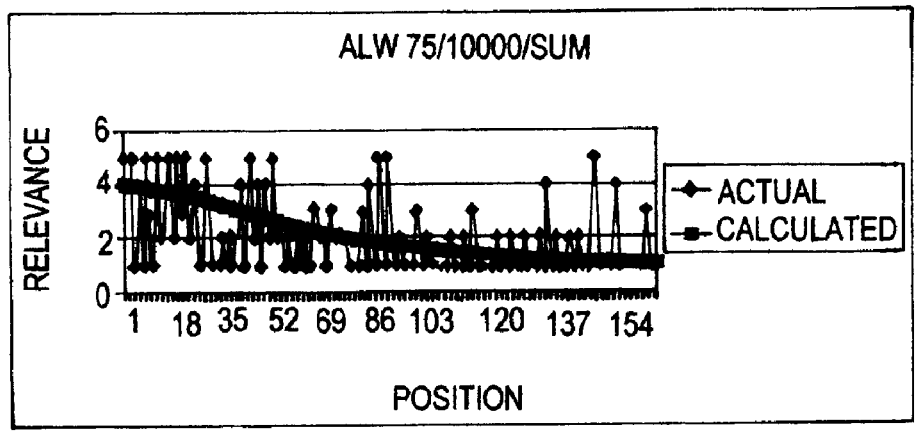
FIG. 3b is a graph of relevance of hits taken from the Google® search of FIG. 3a shown at various positions by searching using the algorithm of the present invention.
Figure 3C:
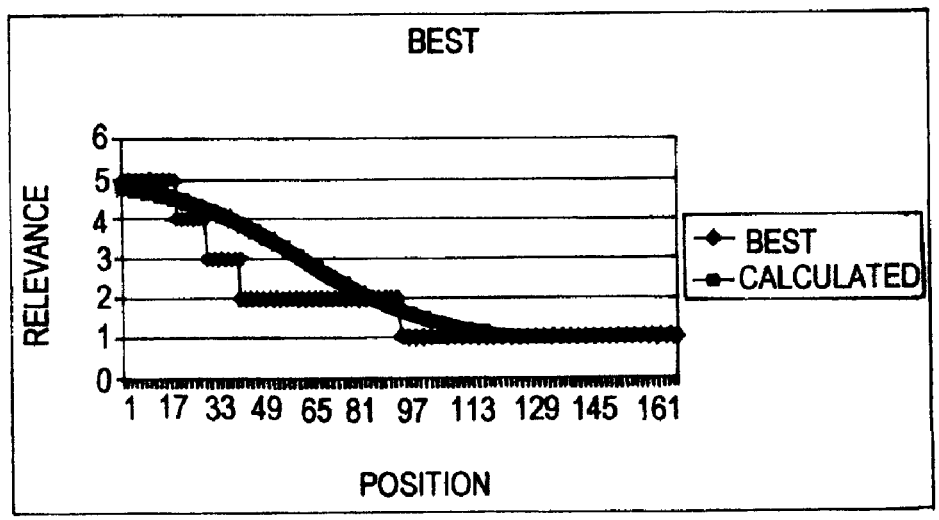
FIG. 3c is an ideal graph of perfect relevance for position for a search of "AMD Linux workstations"
Figure 4A:
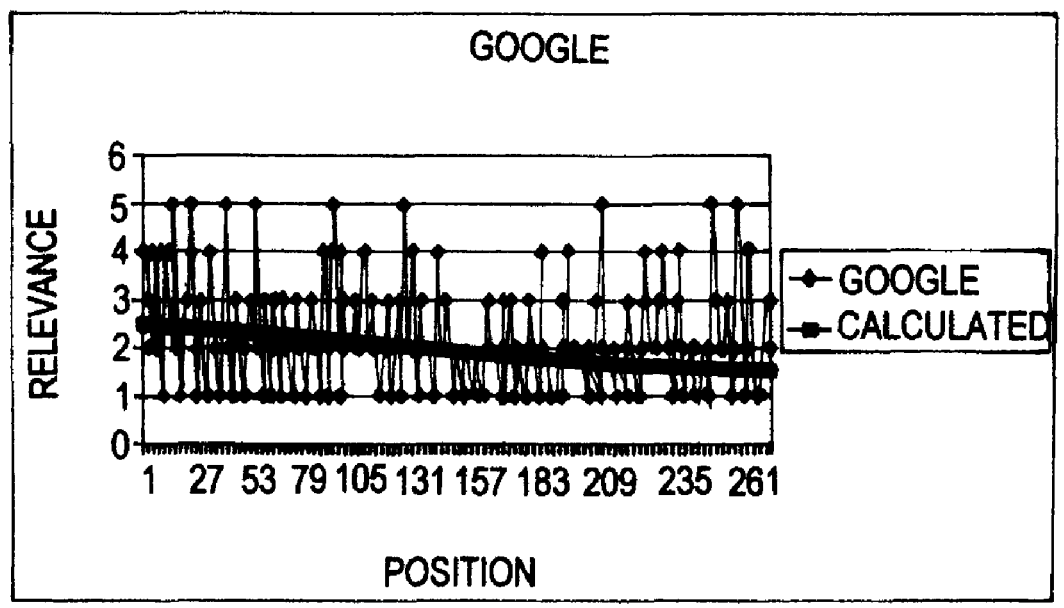
FIG. 4a is a graph showing relevance of hits at various positions in a search conducted by Google® of an article describing a text classification program.
Figure 4B:
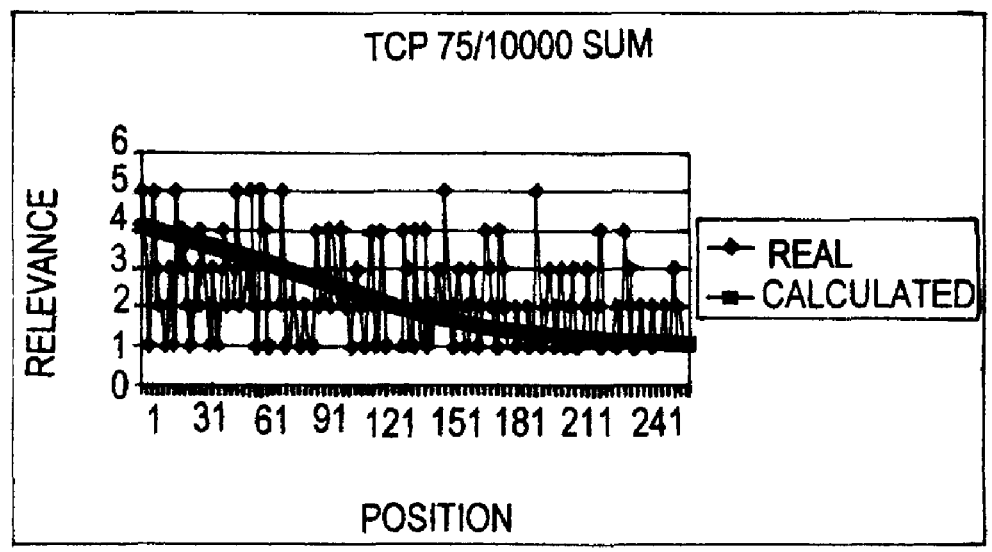
FIG. 4b is a graph of improved relevance of hits taken from the Google® search of FIG. 4a shown at various positions by searching using the algorithm of the present invention.
Figure 4C:
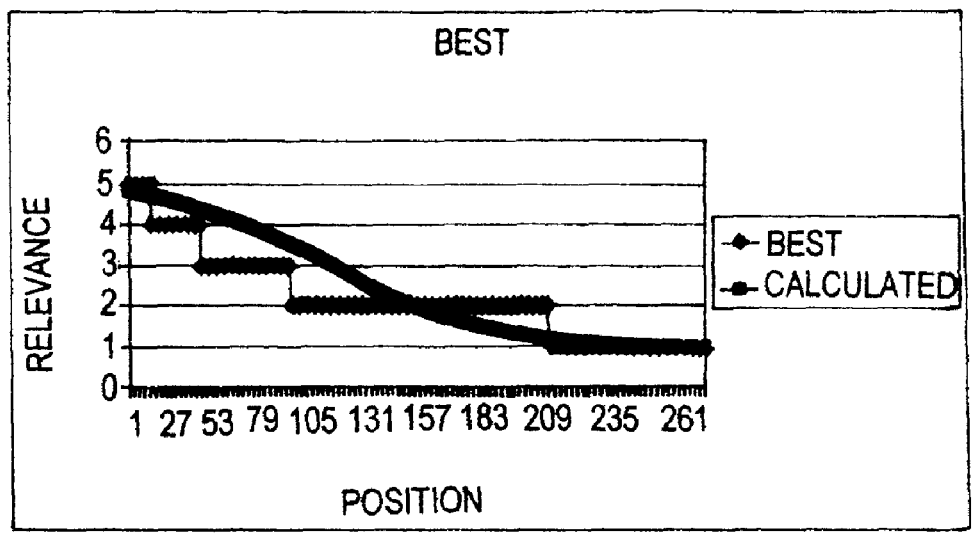
FIG. 4c is an ideal graph of perfect relevance for position for a search of the text in the article describing the text classification program of FIGS. 4a and 4b.

FIGS. 3a, 3b and 3c show similar findings for a search involving the phrase "AMD Linux workstations." FIGS. 4a and 4b further illustrate improvement in relevance for a text classification search. In this search, an article taken from Doctor Dobbs Journal describing the code for a simple Bayesian text classifier was first identified as a target piece of text. Subsequently, a Google search was conducted using appropriate search words. As before, the results of the Google search were re-ranked according to the present invention.

VI) Quantification of Improvement

Although scoring of relevance is subjective, it is nonetheless possible to quantify the improvement of the present invention over other web searching tools.

A) Ad hoc Methods

The simplest, although possibly the most meaningful, means of measuring goodness of search results is "first page relevance." That is, how many of the first ten pieces of text are highly relevant to the user.

At first glance, a search that returned only two highly relevant pieces of text on the first page is less "good" than one that returned ten highly relevant pieces of text. At times this may lead to misperceptions. In some cases, there might be a very limited number of highly relevant items on the web. No matter how good the search program, it cannot find what is not there. Likewise, a very popular item might have many thousands of relevant pieces of text such that filling the first page with "good" results is easy.

In our invention, we measure "first page relevance" by establishing the highest possible score for "first page relevance" based on perfect sorting. If we assign a value of 5 to a piece of highly relevant text (and lower values to less relevant text) then a first page having ten such pieces of text achieves a score of 50. If, however, there are only six pieces of highly relevant text in the universe of web text, a perfect search program would achieve a score of only 30.

A search program that places all six of these highly relevant pieces of text on the first page has done as well as can be done.

Figure 5A:
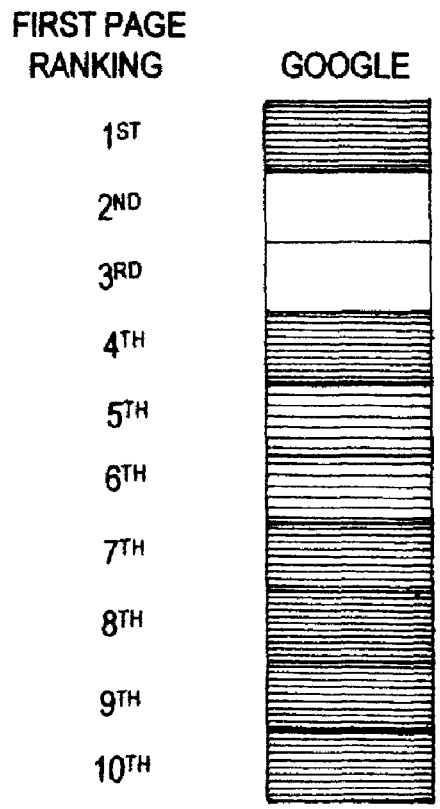
FIG. 5a is a ranking of relevance of text returned from the search phrase "Sweet Home Alabama" where darker shades denote greater relevance to the movie by that name.
Figure 5B:
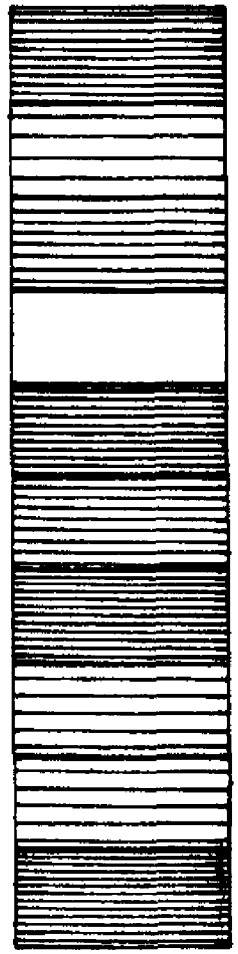
FIG. 5b shows the relevance of the text charted in FIG. 5a when the pieces of text are re-sorted using the algorithm of the present invention wherein shades on the left denote relevance to the movie and shades on the right denote relevance to the song.
Figure 5B:
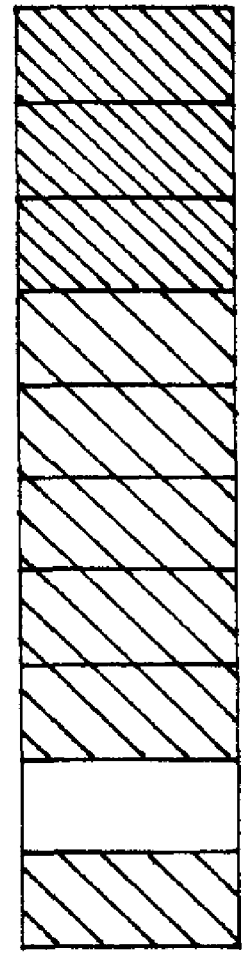

A graphical depiction of "first page relevance" is shown in FIGS. 5a and 5b. FIG. 5a shows first page relevance from a search using the search words "Sweet home Alabama." This string was chosen for its ambiguity—it could refer to the movie starring Reese Witherspoon or to the song by Lynyrd Skynrd. FIG. 5a represents the different shades or degrees of relevance of text returned from the search phrase "Sweet Home Alabama." Degrees of line concentration denote relevance to the movie by that name (more concentrated lines denotes greater relevance). If the user's interest were in the song, the relevance of the text returned by the search program is poor—many of the pieces of text listed on the first page refer to the movie by the same name. Text represented by dark blue is highly relevant to the movie. Shades represented by diagonal lines would denote relevance to the song, although no text relevant to the song was found on the first page.

FIG. 5b shows the relevance if the pieces of text are re-sorted according to the present invention. Shades denote relevance to the movie; shades denote relevance to the song.

In our metric, the goodness of the search results is a simple ratio of the observed score to the highest possible score. Thus, in the example given, the search earned a score of 40 if the user's interest had been the movie but zero if it had been the song.

For some businesses operating in the web domain, other measures of goodness pertain. For example, "first five relevance" might be important to many advertisers. That is, advertisers may find that many users will look no farther than the first five items returned by the search program.

Our metric can be readily modified to quantify goodness of results for any such ad hoc means of estimation.

B) Holistic Method.

A more holistic method examines a fuller range of results without resort to arbitrary cutoffs. In addition, the method should take full regard for the possibility that a very small number of relevant pieces of text may exist or a very large number may exist.

In our method of quantification, the relevance scores of pieces of text are fit to a weighted logistic curve. Our logistic curve has the formula:

$$\text{Log}((y-1)/(4-(y-1)))=m \text{ times } x+b$$

Where:
y is the relevance score
The range of y is: $1<=y<=5$
x is the observed rank
m,b are fitting coefficients computed by least squares.

In addition, a small offset is added to the numerator and the denominator to avoid log's of zero.

It is immediately evident that there are far more pieces of text with low relevance than there are those with high relevance. This requires that the formulas be weighted to give equal weight to each category of results. Consequently, in the least squares fit, each result is weighted by 1/(number of results in its category).

Applying this formula, including offsets and weights, gives the final formula for predicted relevance.

$$\text{Predicted relevance}(i)=\text{Lower asymptote}+((\text{upper asymptote} \times 10^{}(m \text{ times rank}(i)+b)/(1+10^{}(m \text{ times rank}(i)+b))$$

In the present embodiment, the lower asymptote and upper asymptote are conveniently chosen as 0.9 and 5.1, respectively.

C) Interpretation of the Fitted Curve

Returning to FIGS. 2a, b, and c, the curved lines passing through the graphs of relevance versus search rank can be interpreted.

In the holistic method, the goodness of results is measured by the slope coefficient "m." With perfect sorting the slope will depend on the number of pieces of text having intermediate levels of relevance (that is relevance scores of 4, 3 or 2). Thus, the best estimate of goodness of results is the ratio of the slope coefficient of actual results to the slope coefficient of perfect results.

In FIG. 2c, the fitted curve is shown for results that are perfectly sorted. In this example, the slope coefficient of the fitted curve is −0.0099. The Google results (FIG. 2a) produce a slope coefficient of −0.0028. The present invention has an intermediate value of the slope coefficient of −0.0044 (FIG. 2b).

Likewise, we may provide an estimate of percent improvement over Google® by computing the ratio (m(present invention)−m(Google))/(m(perfect sorting)−m(Google))

In the chosen example, the present invention improves the ranking of results by (0.0044−0.0028)/(0.0099−0.0028)=22.5%

Inspection of FIGS. 2a and 2b shows clearly that an improvement of this magnitude is clearly evident in the re-sorted rankings.

Those skilled in the art will recognize that any other search program can be used in place of Google® including search programs that may be used for specialized applications.

Further refinements of the algorithms described herein will be self-evident to those exercising the capabilities of the present invention. Not the least of these refinements is the separation of the commercial text, html and other ancillary material from the descriptive portion of the contents of the results returned by the search program.

Software

The key portion of the present invention is the software that computes the overlap of two fingerprints. This software accepts as input the desired number of categories and a specification of precision. The software reads the classification categories and weights and then collapses the weights to the specified precision.

Output consists of the overlap of a target fingerprint with the fingerprint of, say, a few hundred pieces of text found by a search program. The overlap is computed using several variations based on the method of collapsing the weights to a uniform level of precision (i.e. the sum, average, minimum, maximum, median).

Flow Chart

Figure 6:
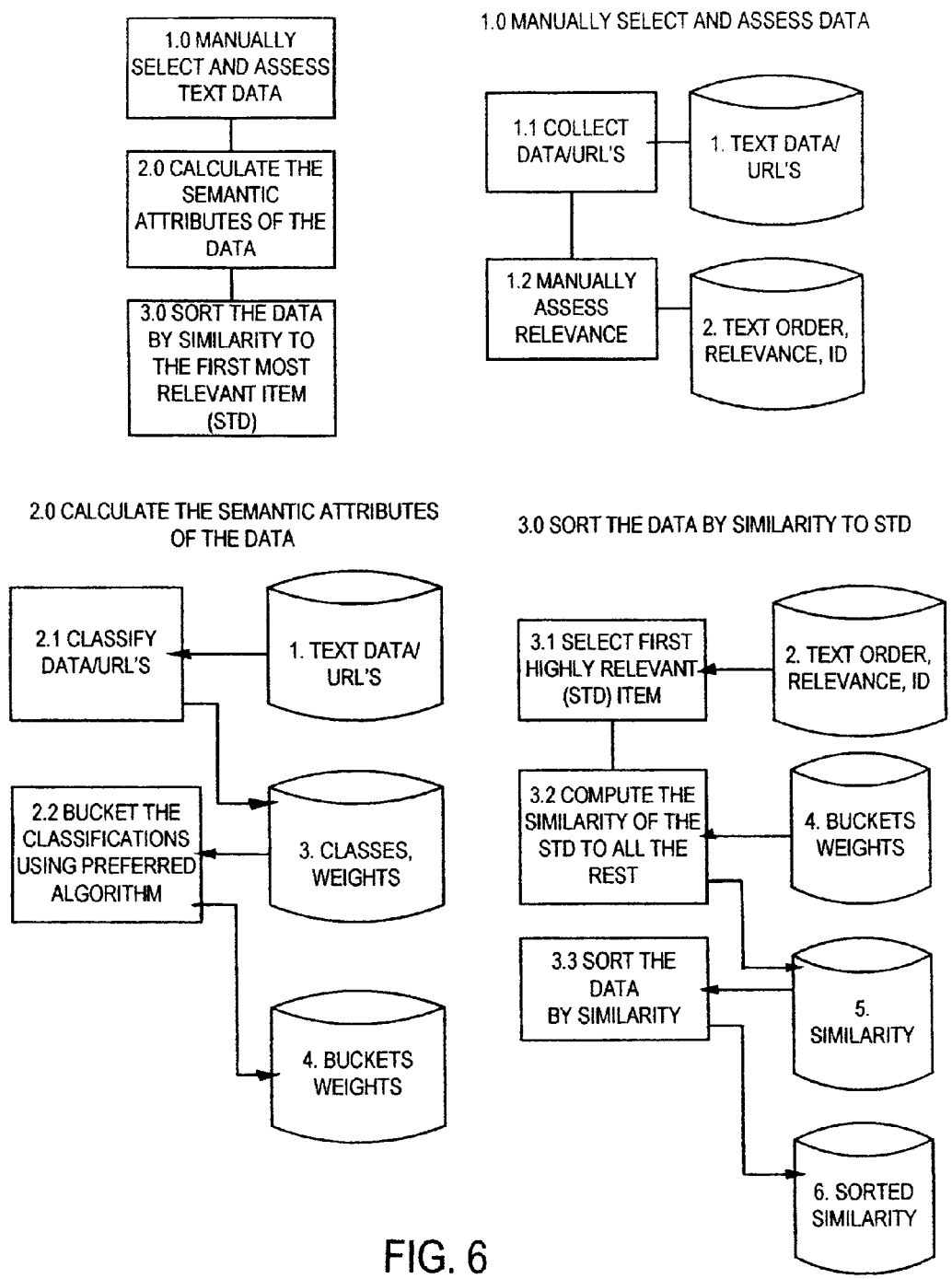
FIG. 6 is a simplified flow chart of the operation of software that reads text, processes classification data and compares the fingerprint of the target to the fingerprint of the text in accordance with the method of the present invention.

FIG. 6 depicts a simplified flow chart of the operation of the software that reads text, processes classification data and compares the fingerprint of the target to the fingerprint of text to which the target is to be compared.

Programming Code

It should be appreciated that there are a number of ways known to those skilled in computer science to write software code that implements the algorithm of the present invention. A truncated portion of one particular relevant software code is in the form of an accompanying computer program listing Appendix. This software renders into practice the flow chart shown above and contains code for accessing text, calculating appropriate attributes of the text and comparing accessed text to a chosen target.

Note, as a practical matter, it is likely that the cooperation of Google® would be necessary to perform the embodiment of the method of the present invention wherein the results of a search by "Google® are re-ranked in accordance with the algorithm of the present invention.

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A method of locating relevant documents within a universe of documents, the documents of said universe having been classified so that each document in the universe has a fingerprint, said fingerprint comprising a list of weights associated with particular topic categories in a classification system, each of the weights representing a degree to which the document relates to the particular topic category that the weight is associated with, the weights obtained automatically from a computer program, the method having a scalable time complexity of $O(N^x)$ where $0<=X<=1.0$ for a universe of text on the world wide web and comprising: a computer processor creating a fingerprint for a piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching all or a portion of the universe of documents by comparing the fingerprint for the first piece of text with the fingerprint for each document in the all or a portion of the universe of documents, and ranking the all or a portion of the universe of documents based on a degree to which a document has a mathematical overlap with the fingerprint of the first piece of text, the method configured to locate the relevant documents within the universe of documents whether the universe of documents includes text written in one language or in more than one language.

2. The method of claim 1, wherein either the weights are scaled or else the mathematical overlaps are scaled.

3. The method of claim 2, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

4. The method of claim 1, wherein a selected number of weights is between 1 and 75 and the classification system is the Dewey Decimal System.

5. The method of claim 1, wherein a level of precision is set by setting a number of digits in a classification code of the classification system.

6. A method of locating relevant documents within a universe of documents, the documents of said universe having been classified so that each document in the universe has a fingerprint, said fingerprint comprising a list of weights associated with particular topic categories in a classification system, each of the weights representing a degree to which the document relates to the particular topic category that the weight is associated with, the weights obtained automatically from a computer program, the method having a scalable time complexity of $O(N^x)$ where $0<=X<=1.0$ for a universe of text on the world wide web and comprising:

a computer processor creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching all or a portion of the universe of documents by comparing the fingerprint for the first piece of text with the fingerprint for each document in that all or a portion of the universe of documents, and selecting those documents whose fingerprints have a predetermined degree of mathematical overlap with the fingerprint of the first piece of text, the method configured to locate the relevant documents within the universe of documents whether the universe of documents includes text written in one language or in more than one language.

7. The method of claim 6, wherein either the weights are scaled or else the mathematical overlaps are scaled.

8. The method of claim 7, wherein a (i) fingerprint of a document, (ii) a fingerprint of the first piece of text or (iii) a fingerprint of a document and a fingerprint of the first piece of text only includes those topic categories whose associated weights are among a selected number of highest associated weights for that document.

9. The method of claim 6, wherein a selected number of weights is between 1 and 75 and the classification system is the Dewey Decimal System.

10. A method of locating relevant documents within a universe of documents, the method having a scalable time complexity of $O(N^x)$ where $0<=X<=1.0$ for a universe of text on the world wide web and comprising:

a computer processor creating a fingerprint for each document in the universe of documents, said fingerprint comprising a list of weights associated with particular topic categories in a classification system, each of the weights representing a degree to which the document relates to the particular topic category that the weight is associated with, the weights obtained automatically from a computer program, a computer processor creating a fingerprint for a first piece of text, the fingerprint comprising a list of weights associated with particular topic categories in the classified system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching all or a portion of the universe of documents by comparing the fingerprint for the first piece of text with the fingerprint for each document in that all or a portion of the universe of documents, and ranking the all or a portion of the universe of documents based on a degree to which a document has a mathematical overlap with the fingerprint of the first piece of text, the method configured to locate the relevant documents within the universe of documents whether the universe of documents includes text written in one language or in more than one language.

11. The method of claim 10, wherein either the weights are scaled or else the mathematical overlaps are scaled.

12. The method of claim 11, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

13. The method of claim 10, wherein a selected number of weights is between 1 and 75 and the classification system is the Dewey Decimal System.

14. A method of locating relevant documents within a universe of documents, the method having a scalable time complexity of $O(N^x)$ where $0<=X<=1.0$ for a universe of text on the world wide web and comprising:

creating a fingerprint for each document in the universe of documents, said fingerprint comprising a list of weights associated with particular topic categories in a classification system, each of the weights representing a degree to which the document relates to the particular topic category that the weight is associated with, the weights obtained automatically from a computer program, a computer processor creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching all or a portion of the universe of documents by comparing the fingerprint for the first piece of text with the fingerprint for each document in that all or a portion of the universe of documents, and selecting those documents whose fingerprints have a predetermined degree of mathematical overlap with the fingerprint of the first piece of text, the method configured to locate the relevant documents within the universe of documents whether the universe of documents includes text written in one language or in more than one language.

15. The method of claim 14, wherein either the weights are scaled or else the mathematical overlaps are scaled.

16. The method of claim 15, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

17. The method of claim 14, wherein a selected number of weights is between 1 and 75 and the classification system is the Dewey Decimal System.

18. A method of re-ranking a list of documents obtained from a search wherein a ranking of a document in the list is determined by a relevance of the document to a search text, the method having a scalable time complexity of $O(N^x)$ where $0<=X<=1.0$ for a universe of text on the world wide web and comprising:

a computer processor classifying the list of documents so that each document in the list has a fingerprint, said fingerprint comprising a list of weights associated with particular topic categories in a classification system, each of the weights representing a degree to which the document relates to the particular topic category that the weight is associated with, the weights obtained automatically from a computer program, a computer processor creating a fingerprint for the first piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching the list of documents by comparing the fingerprint for the first piece of text with the fingerprint for each document in the list of documents, re-ranking the list of documents based on a degree to which a document in the list has a mathematical overlap with the fingerprint of the first piece of text, the method configured to re-rank the list of documents based on relevance to the search text whether the list of documents includes text written in one language or in more than one language.

19. The method of claim 18, wherein either the weights are scaled or else the mathematical overlaps are scaled.

20. The method of claim 19, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

21. The method of claim 18, wherein a selected number of weights is between 1 and 75 and the classification system is the Dewey Decimal System.

22. A method of re-ranking a list of documents obtained from a search wherein a ranking of a document in the list is determined by a relevance of the document to a search text, and wherein each document in the list has a fingerprint, said fingerprint comprising a list of weights associated with particular topic categories in a classification system, each of the weights representing a degree to which the document related to the particular topic category that the weight is associated with, the weights obtained automatically from a computer program, the method having a scalable time complexity of $O(N^x)$ where $0<=X<=1.0$ for a universe of text on the world wide web and comprising:

a computer processor creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for the first piece of text is associated with, the weights in the fingerprint for said first piece of text obtained automatically from a computer program, a computer processor searching the list of documents by comparing the fingerprint for the first piece of text with the fingerprint for each document in the list of documents, re-ranking the list of documents based on a degree to which a fingerprint of a document in the list has a mathematically overlap with the fingerprint of the first piece of text, the method configured to re-rank the list of documents based on relevance to the search text whether the list of documents includes text written in one language or in more than one language.

23. The method of claim 22, wherein either the weights are scaled or else the mathematical overlaps are scaled.

24. The method of claim 23, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

25. The method of claim 22, wherein a selected number of weights is between 1 and 75 and the classification system is the Dewey Decimal System.

26. A method of re-ranking a list of document obtained from a search wherein a ranking of a document in the list of documents is determined by a relevance of the document to a search text, wherein the list of documents has been classified and appears in an inverted list, said inverted list comprising for each topic category of a classification system a weight associated with a particular document of the list of documents, the weight representing a degree to which the particular document relates to said each topic category, the weights obtained automatically from a computer program, the method having a scalable time complexity of $O(N^x)$ where $0<=X<=1.0$ for a universe of text on the world wide web and comprising:

creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program, a computer processor searching the list of documents by comparing the fingerprint for the first piece of text with the fingerprint for each document in the list of documents, and a computer processor re-ranking the list of documents based on a degree to which a fingerprint of a document in the list has a mathematical overlap with the fingerprint of the first piece of text, the method configured to re-rank the list of documents based on relevance to the search text whether the list of documents includes text written in one language or in more than one language.

27. The method of claim 26, wherein either the weights are scaled or else the mathematical overlaps are scaled.

28. The method of claim 27, wherein an upper bound to the mathematical overlap is calculated dynamically, said upper bound used to reduce a magnitude of documents for which the mathematical overlap is calculated.

29. The method of claim 27, wherein a fingerprint of a document, (ii) a fingerprint of the first piece of text or (iii) a fingerprint of a document and a fingerprint of the first piece of text only includes those topic categories whose associated weights are among a selected number of highest associated weights for that document.

30. The method of claim 26, wherein a selected number of weights is between 1 and 75 and the classification system is the Dewey Decimal System.

31. A method of re-ranking a list of documents obtained from a search wherein a ranking of a document in the list is determined by a relevance of the document to a search text, the method performed by a computer processor, having a scalable time complexity of $O(N^x)$ where $0<=X<=1.0$, and comprising:

classifying the list of documents so that each document in the list has a fingerprint, said fingerprint comprising a list of weights associated with particular topic categories in a classification system, each of the weights representing a degree to which the document relates to the particular topic category that the weight is associated with, the weights obtained automatically from a computer program, providing a user fingerprint, the user fingerprint comprising a list of cumulative weights associated with particular topic categories in the classification system, each of the cumulative weights representing a degree to which text or texts in a link recently accessed by a user relates to the particular topic category that the cumulative weight is associated with, the cumulative weights obtained from weights that in turn were obtained automatically from a computer program, searching the list of documents by comparing the user fingerprint with the fingerprint for each document in the list of documents, and re-ranking the list of documents based on a degree to which a fingerprint of the document in the list has a mathematical overlap with the user fingerprint, the method configured to re-rank the list of documents based on relevance to the search text whether the list of documents includes text written in one language or in more than one language.

32. The method of claim 31, wherein either the weights are scaled or else the mathematical overlaps are scaled.

33. The method of claim 32, wherein a fingerprint of a document only includes those topic categories whose associated weights are among a selected number of highest associated weights for that document.

34. The method of claim 31, wherein a selected number of weights is between 1 and 75 and the classification system is the Dewey Decimal System.

35. The method of claim 31, wherein a level of precision is set by setting a number of digits in a classification code of the classification system.

36. A method of re-ranking a list of documents obtained from a search wherein a ranking of a document in the list is determined by a relevance of the document to a search text, and wherein each document in the list has a fingerprint, said fingerprint comprising a list of weights associated with particular topic categories in a classification system, each of the weights representing a degree to which the document relates to the particular topic category that the weight is associated with, the weights obtained automatically from a computer program, the method performed by a computer processor, having a scalable time complexity of $O(N^x)$ where $0<=X<=1.0$, and comprising:

providing a user fingerprint, the user fingerprint comprising a list of cumulative weights associated with particular topic categories in the classification system, each of the cumulative weights representing a degree to which text or texts in a link recently accessed by a user relate to the particular topic category that the cumulative weight is associated with, the cumulative weights obtained from weights that in turn were obtained automatically from a computer program, searching the list of documents by comparing the user fingerprint with the fingerprint for each document in the list of documents, and re-ranking the list of documents based on a degree to which a fingerprint of a document in the list has a mathematical overlap with the user fingerprint, the method configured to re-rank the list of documents based on relevance to the search text whether the list of documents includes text written in one language or in more than one language.

37. The method of claim 36, wherein either the weights are scaled or else the mathematical overlaps are scaled.

38. The method of claim 37, wherein a fingerprint of a document only includes those topic categories whose associated weights are among a selected number of highest associated weights for that document.

39. The method of claim 36, wherein a selected number of weights is between 1 and 75 and the classification system is the Dewey Decimal System.

40. A method of re-ranking a list of documents obtained from a search wherein a ranking of a document in the list is determined by a relevance of the document to a search text, wherein the list of documents has been classified and appears in an inverted list, said inverted list comprising for each topic category of a classification system a weight associated with a particular document of the list of documents, the weight representing a degree to which the particular document relates to said each topic category, the weights obtained automatically from a computer program, the method performed by a computer processor, having a scalable time complexity of $O(N^x)$ where $0<=X<=1.0$, and comprising:

providing a user fingerprint, the user fingerprint comprising a list of cumulative weights associated with particular topic categories in the classification system, each of the cumulative weights representing a degree to which text or texts in a link recently accessed by a user relates to the particular topic category that the cumulative weight is associated with, the cumulative weights obtained from weights that in turn were obtained automatically from a computer program, searching the inverted list by comparing the user fingerprint with the fingerprint for each document in the inverted list, and re-ranking the list of documents by making use of a degree to which a fingerprint of a document in the inverted list has a mathematical overlap with the user fingerprint the method configured to re-rank the list of documents based on relevance to the search text whether the list of documents includes text written in one language or in more than one language.

41. The method of claim 40, wherein either the weights are scaled or else the mathematical overlaps are scaled.

42. The method of claim 41, wherein an upper bound to the mathematical overlap is calculated dynamically, said upper bound used to reduce a magnitude of documents for which the mathematical overlap is calculated.

43. The method of claim 41, wherein a fingerprint of a document only includes those topic categories whose associated weights are among a selected number of highest associated weights for that document.

44. The method of claim 40, wherein a selected number of weights is between 1 and 75 and the classification system is the Dewey Decimal System.

45. A method of locating relevant documents within a universe of documents, the documents of said universe having been classified and appears in an inverted list, said inverted list comprising for each category of a classification system a weight associated with a particular document of the list of documents, each of the weights representing a degree to which the particular document relates to said each topic category, the weights obtained automatically from a computer program, the method having a scalable time complexity of $O(N^x)$ where $0<=X<=1.0$ for a universe of text on the world wide web and comprising:

creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for said piece of text is associated with, the weights in the fingerprint for said first piece of text obtained automatically from a computer program, a computer processor searching all or a portion of the universe of documents by comparing the fingerprint for the first piece of text with the fingerprint for each document in that all or a portion of the universe of documents, and ranking the all or a portion of the universe of documents by making use of a degree to which a fingerprint of a document in the inverted list has a mathematical overlap with the fingerprint of the first piece of text, the method configured to locate the relevant documents within the universe of documents whether the universe of documents includes text written in one language or in more than one language.

46. The method of claim 45, wherein either the weights are scaled or else the mathematical overlaps are scaled.

47. The method of claim 46, wherein an upper bound to the mathematical overlap is calculated dynamically, said upper bound used to reduce a magnitude of documents for which the mathematical overlap is calculated.

48. The method of claim 46, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

49. The method of claim 45, wherein a selected number of weights is between 1 and 75 and the classification system is the Dewey Decimal System.

50. A method of locating relevant documents within a universe of documents, the documents of said universe having been classified and appears in an inverted list,
    said inverted list comprising for each topic category of a classification system a weight associated with a particular document of the list of documents, each of the weights representing a degree to which the particular document relates to said each topic category, the weights obtained automatically from a computer program, the method having a scalable time complexity of $O(N^x)$ where $0<=X<=1.0$ for a universe of text on the world wide web and comprising:
    a computer processor creating a fingerprint for a first piece of text, the fingerprint comprising a list of weights associated with particular topic categories in the classification system, each of the weights in the fingerprint for said first piece of text representing a degree to which the first piece of text relates to the particular topic category that the weight in the fingerprint for said first piece of text is associated with, the weights in the fingerprint for said first piece of text obtained automatically from a computer program,
    a computer processor searching all or a portion of the universe of documents by comparing the fingerprint for the first piece of text with the fingerprint for each document in that all or a portion of the universe of documents, and selecting those documents whose fingerprints have a predetermined degree of mathematical overlap with the fingerprint of the first piece of text, the method configured to locate the relevant documents within the universe of documents whether the universe of documents includes text written in one language or in more than one language.

51. The method of claim 50, wherein either the weights are scaled or else the mathematical overlaps are scaled.

52. The method of claim 51, wherein an upper bound to the mathematical overlap is calculated dynamically, said upper bound used to reduce a magnitude of documents for which the mathematical overlap is calculated.

53. The method of claim 51, wherein (i) a fingerprint of a document, (ii) a fingerprint of the first piece of text or (iii) a fingerprint of a document and a fingerprint of the first piece of text only includes those topic categories whose associated weights are among a selected number of highest associated weights for that document.

54. The method of claim 50, wherein a selected number of weights is between 1 and 75 and the classification system is the Dewey Decimal System.

55. A method of locating relevant documents within a universe of documents, the documents of said universe having been classified so that each document in the universe has a fingerprint, said fingerprint comprising a list of weights associated with particular topic categories in a classification system, each of the weights representing a degree to which the document relates to the particular topic category that the weight is associated with, the weights obtained automatically from a computer program, the method having a scalable time complexity of $O(N^x)$ where $0<=X<=1.0$ for a universe of text on the world wide web and performed by a computer processor and comprising:
    providing a user fingerprint, the user fingerprint comprising a list of cumulative weights associated with particular topic categories in the classification system, each of the cumulative weights representing a degree to which text of texts in a link recently accessed by a user related to the particular topic category that the cumulative weight is associated with, the cumulative weights obtained from weights that in turn were obtained automatically from a computer program, searching all or a portion of the universe of documents by comparing the user fingerprint with the fingerprint for each document in that all or a portion of the universe of documents, and
    ranking the all or a portion of the universe of documents based on a degree to which a document has a mathematical overlap with the user fingerprint, the method configured to locate the relevant documents within the universe of documents whether the universe of documents includes text written in one language or in more than one language.

56. The method of claim 55, wherein either the weights are scaled or else the mathematical overlaps are scaled.

57. The method of claim 56, wherein a fingerprint of a document only includes those topic categories whose associated weights are among a selected number of highest associated weights for that document.

58. The method of claim 55, wherein a selected number of weights is between 1 and 75 and the classification system is the Dewey Decimal System.

59. A method of locating relevant documents within a universe of documents, the documents of said universe having been classified so that each document in the universe has a fingerprint, said fingerprint comprising a list of weights associated with particular topic categories in a classification system, each of the weights representing a degree to which the document relates to the particular topic category that the weight is associated with, the weights obtained automatically from a computer program, the method having a scalable time complexity of $O(N^x)$ where $0<=X<=1.0$ for a universe of text on the world wide web and performed by a computer processor comprising:
    providing a user fingerprint, the user fingerprint comprising a list of cumulative weights associated with particular topic categories in the classification system, each of the cumulative weights representing a degree to which text or texts in a link recently accessed by a user relates to the particular topic category that the cumulative weight is associated with, the cumulative weights obtained from weights that in turn were obtained automatically from a computer program, searching all or a portion of the universe of documents by comparing the user fingerprint with the fingerprint for each document in that all or a portion of the universe of documents, and selecting those documents whose fingerprints have a predetermined degree of mathematical overlap with the user fingerprint, the method configured to locate the relevant documents within the universe of documents whether the universe of documents includes text written in one language or in more than one language.

60. The method of claim 59, wherein either the weights are scaled or else the mathematical overlaps are scaled.

61. The method of claim 60, wherein a fingerprint of a document only includes those topic categories whose associated weights are among a selected number of highest associated weights for that document.

62. The method of claim 59, wherein a selected number of weights is between 1 and 75 and the classification system is the Dewey Decimal System.

63. A method performed by a computer processor of locating relevant documents within a universe of documents, comprising:

creating a fingerprint for each document in the universe of documents, said fingerprint comprising a list of weights associated with particular topic categories in a classification system, each of the weights representing a degree to which the document relates to the particular topic category that the weight is associated with, the weights obtained automatically from a computer program, the method having a scalable time complexity of $O(N^x)$ where $0<=X<=1.0$ for a universe of text on the world wide web and performed by a computer processor comprising:

providing a user fingerprint, the user fingerprint comprising a list of cumulative weights associated with particular topic categories in the classification system, each of the cumulative weights representing a degree to which text or texts in a link recently accessed by a user relates to the particular topic category that the cumulative weight is associated with, the cumulative weights obtained from weights that in turn were obtained automatically from a computer program, searching all or a portion of the universe of documents by comparing the user fingerprint with the fingerprint for each document in that all or a portion of the universe of documents, and ranking the all or a portion of the universe of documents based on a degree to which a document has a mathematical overlap with the user fingerprint, the method configured to locate the relevant documents within the universe of documents whether the universe of documents includes text written in one language or in more than one language.

64. The method of claim 63, wherein either the weights are scaled or else the mathematical overlaps are scaled.

65. The method of claim 64, wherein a fingerprint of a document only includes those topic categories whose associated weights are among a selected number of highest associated weights for that document.

66. The method of claim 63, wherein a selected number of weights is between 1 and 75 and the classification system is the Dewey Decimal System.

67. A method of locating relevant documents within a universe of documents, the method performed by a computer processor and having a scalable time complexity of $O(N^x)$ where $0<=X<=1.0$ for a universe of text on the world wide web, the method comprising:

creating a fingerprint for each document in the universe of documents, said fingerprint comprising a list of weights associated with particular topic categories in a classification system, each of the weights representing a degree to which the document relates to the particular topic category that the weight is associated with, the weights obtained automatically from a computer program, providing a user fingerprint, the user fingerprint comprising a list of cumulative weights associated with particular topic categories in the classification system, each of the cumulative weights representing a degree to which text or texts in a link recently accessed by a user relates to the particular topic category that the cumulative weight is associated with, the cumulative weights obtained from weights that in turn were obtained automatically from a computer program, searching all or a portion of the universe of documents by comparing the user fingerprint with the fingerprint for each document in that all or a portion of the universe of documents, and selecting those documents whose fingerprints have a predetermined degree of mathematical overlap with the user fingerprint, the method configured to locate the relevant documents within the universe of documents whether the universe of documents includes text written in one language or in more than one language.

68. The method of claim 67, wherein either the weights are scaled or else the mathematical overlaps are scaled.

69. The method of claim 68, wherein a fingerprint of a document only includes those topic categories whose associated weights are among a selected number of highest associated weights for that document.

70. The method of claim 67, wherein a selected number of weights is between 1 and 75 and the classification system is the Dewey Decimal System.

71. A method according to claim 31 or 36 or 40 or 55 or 59 or 63 or 67, wherein a second user fingerprint is maintained, the second user fingerprint constructed identically to the user fingerprint except that for the second user fingerprint the text or texts recently accessed by the user is more recently accessed by the user than the text or texts recently accessed by the user for the user fingerprint, calculating a mathematical overlap between the user fingerprint and the second user fingerprint, the second user fingerprint superseding the user fingerprint when said mathematical overlap exceeds a set value.

72. A method according to claim 2 or 7 or 11 or 15 or 19 or 23 or 27 or 32 or 37 or 41 or 46 or 51 or 56 or 60 or 64 or 68, wherein a numerical magnitude of topic categories is adjusted.

73. A method according to claim 2 or 7 or 11 or 15 or 19 or 23 or 27 or 32 or 37 or 41 or 46 or 51 or 56 or 60 or 64 or 68, wherein some weights of the fingerprint are disregarded because they are not relevant.

* * * * *

UNITED STATES PATENT AND TRADEMARK OFFICE
CERTIFICATE OF CORRECTION

| | | |
|---|---|---|
| PATENT NO. | : 8,019,754 B2 | |
| APPLICATION NO. | : 11/731751 | |
| DATED | : September 13, 2011 | |
| INVENTOR(S) | : John Barrett Collins et al. | |

It is certified that error appears in the above-identified patent and that said Letters Patent is hereby corrected as shown below:

Column 24, claim 29:

Line 48 should be corrected as follows:
Change:

--29. The method of claim 27, wherein a fingerprint....-- to

"29. The method of claim 27, wherein (i) a fingerprint"

Column 30, claim 73:

Line 61 should be corrected as follows:
Change:

--73. A method according to claim... -- to

"73. A method according to claims ..."

Signed and Sealed this
Eighth Day of November, 2011

David J. Kappos
*Director of the United States Patent and Trademark Office*